US009267610B2

(12) United States Patent
Ogawa et al.

(10) Patent No.: US 9,267,610 B2
(45) Date of Patent: Feb. 23, 2016

(54) HYDRAULIC PRESSURE CONTROL DEVICE

(71) Applicant: ADVICS CO., LTD., Kariya-shi, Aichi-ken (JP)

(72) Inventors: Masato Ogawa, Ichinomiya (JP); Ayumi Yamamura, Chiryu (JP); Masayuki Hijikata, Nagoya (JP); Kouji Yanai, Kariya (JP)

(73) Assignees: ADVICS CO., LTD., Aichi-ken (JP); DENSO CORPORATION, Aichi (JP)

( * ) Notice: Subject to any disclaimer, the term of this patent is extended or adjusted under 35 U.S.C. 154(b) by 196 days.

(21) Appl. No.: 13/713,451

(22) Filed: Dec. 13, 2012

(65) Prior Publication Data

US 2013/0153799 A1   Jun. 20, 2013

(30) Foreign Application Priority Data

Dec. 14, 2011   (JP) .................................. 2011-273008

(51) Int. Cl.
*F16K 27/02* (2006.01)
*F16K 31/04* (2006.01)
*B60T 8/36* (2006.01)

(52) U.S. Cl.
CPC ............... *F16K 31/046* (2013.01); *B60T 8/368* (2013.01); *F16K 27/029* (2013.01)

(58) Field of Classification Search
CPC ....... F16K 27/029; B60T 8/368; H01F 7/126; H01F 7/127
USPC .......................... 251/129.15; 303/119.2, 119.3
See application file for complete search history.

(56) References Cited

U.S. PATENT DOCUMENTS

| | | | | |
|---|---|---|---|---|
| 5,662,392 A | * | 9/1997 | Hinz ........................... | 303/119.2 |
| 6,786,466 B1 | * | 9/2004 | Risch et al. .............. | 251/129.15 |
| 6,935,706 B2 | * | 8/2005 | Jocham ....................... | 303/119.2 |
| 6,985,060 B2 | * | 1/2006 | Parker et al. .................. | 335/282 |
| 7,513,482 B2 | * | 4/2009 | Shibata et al. ............ | 251/129.15 |
| 2007/0108401 A1 | | 5/2007 | Shibata et al. | |
| 2008/0185547 A1 | * | 8/2008 | Tsuruta .................... | 251/129.15 |
| 2009/0114865 A1 | * | 5/2009 | Homann et al. ......... | 251/129.15 |

(Continued)

FOREIGN PATENT DOCUMENTS

| CN | 1962327 A | 5/2007 |
|---|---|---|
| JP | 2004-360864 A | 12/2004 |

(Continued)

OTHER PUBLICATIONS

Office Action dated Mar. 31, 2015, issued by the Japanese Intellectual Property Office in counterpart Japanese Application No. 2011-273008.

(Continued)

*Primary Examiner* — Matthew W Jellett
(74) *Attorney, Agent, or Firm* — Sughrue Mion, PLLC

(57) ABSTRACT

A hydraulic pressure control device includes: a hydraulic pressure unit, in which a solenoid valve for hydraulic pressure control is assembled with a hydraulic pressure block; and an electronic control unit, which includes a circuit board having a drive control circuit of the solenoid valve and stored inside a resin case, wherein a solenoid coil is fit onto the main body of the solenoid valve fixed to the hydraulic pressure block of hydraulic pressure unit, and wherein the solenoid coil is elastically pressed against and fixed to the hydraulic pressure block by a coil pressing arm integrally formed with the resin case.

8 Claims, 2 Drawing Sheets

(56) References Cited

U.S. PATENT DOCUMENTS

2012/0195007 A1* 8/2012 Yanai et al. .................. 361/720
2014/0117266 A1* 5/2014 Jung ........................ 251/129.15

FOREIGN PATENT DOCUMENTS

| JP | 2005029110 A | 2/2005 |
|----|--------------|--------|
| JP | 2006-342863 A | 12/2006 |
| JP | 2011185313 A | 9/2011 |

OTHER PUBLICATIONS

Office Action issued Sep. 6, 2015, issued by the State Intellectual Property Office of the People's Republic of China in counterpart Chinese Patent Application No. 201210544584.

* cited by examiner

HYDRAULIC PRESSURE CONTROL DEVICE

CROSS-REFERENCE TO RELATED APPLICATION

This application claims priority from Japanese Patent Application No. 2011-273008 filed on Dec. 14, 2011, the entire subject matter of which is incorporated herein by reference.

TECHNICAL FIELD

This disclosure relates to a hydraulic pressure control device which is configured by combining a hydraulic pressure unit and an electronic control unit, and specifically, to a hydraulic pressure control device in which a solenoid coil is fit onto the main body of a solenoid valve that is fixed to a hydraulic pressure block (housing) of a hydraulic pressure unit, and the solenoid coil is fixed with a force of an elastic member.

BACKGROUND

As hydraulic pressure control devices for brakes for vehicles, for example, there are hydraulic pressure control devices such as disclosed in JP-A-2004-360864 and 2006-342863.

These and the like are configured by combining a hydraulic pressure unit and an electronic control unit. The hydraulic pressure unit is configured by assembling a solenoid valve for hydraulic pressure control, a pump, a motor for driving the pump, and the like, with a hydraulic pressure block, and the electronic control unit including by a circuit board having a drive control circuit for the solenoid valve or the motor and stored in a resin case.

The main body of the solenoid valve is fixed to the hydraulic pressure block of the hydraulic pressure unit, a solenoid coil is fit onto a protruding portion protruding from the hydraulic pressure block of the main body of the solenoid valve, and then the solenoid coil (a yoke integrated with the coil) is pressed by an elastic supporting member, so that the solenoid valve is fixed to the hydraulic pressure block together with the yoke and the pump.

In JP-A-2004-360864, as the elastic supporting member, a bent flat spring is used. In JP-A-2006-342863, a coil is stored in a cup-shaped yoke having a cut and raised tongue piece as the elastic supporting member, and the tongue piece is used as a spring to interpose the solenoid coil between the hydraulic pressure block of the hydraulic pressure unit and the resin case of the electronic control unit with the force of the spring, together with the yoke.

In addition, it is known that hydraulic pressure control devices, in which rubber balls, a silicon material, or the like that elastically deforms is interposed between a resin case of an electronic control unit and a solenoid coil, and is used as the elastic supporting member. It is also known that hydraulic pressure control devices in which a coil is inserted into a coil case, a flat spring is attached to the coil case with a rivet, and the coil is pressed by the flat spring, and the like.

SUMMARY

The fixing structures of the solenoid coils disclosed in JP-A-2004-360864 and JP-A-2006-342863 and the fixing structure using rubber balls or the like as the elastic supporting member need to secure a space for accommodating the elastic supporting member. Therefore, the cases of the electronic control units become large, and it is difficult to further reduce the physical sizes of the hydraulic pressure control devices. Further, the number of components increases.

Also, the structure of JP-A-2006-342863 needs a process of cutting and raising the tongue portion to be used as the elastic supporting member. Further, in order to insert the solenoid coil is inserted into the coil case and press the coil by the flat spring fixed to the coil case, a flat-spring attaching process or the like is required. Furthermore, even in these structures, according to an increase in the number of components, so that it is difficult to reduce the cost.

This disclosure provides at least a hydraulic pressure control device in which a solenoid coil is fit onto the main body of a solenoid valve fixed to a hydraulic pressure block of a hydraulic pressure unit, and the solenoid coil is pressed to be fixed by an elastic member so that the solenoid coil is fixed without increasing the number of components or the physical size of the hydraulic pressure control device.

In view of the above, a hydraulic pressure control device of this disclosure includes: a hydraulic pressure unit, in which a solenoid valve for hydraulic pressure control is assembled with a hydraulic pressure block; and an electronic control unit, which includes a circuit board having a drive control circuit of the solenoid valve and stored inside a resin case. Further, the hydraulic pressure control device of this disclosure is configured as described below.

In the hydraulic pressure control device of this disclosure, a solenoid coil is fit onto the main body of the solenoid valve fixed to the hydraulic pressure block of hydraulic pressure unit, and the solenoid coil is elastically pressed against and fixed to the hydraulic pressure block by a coil pressing arm integrally formed with the resin case.

In the above described hydraulic pressure control device, at least one of the thickness and width of the coil pressing arm may be reduced from the root side of the arm connected to the resin case toward the front end side. The thickness or width may be reduced gradually or in a stepwise fashion. Meanwhile, the front end of the coil pressing arm may extend over the center of the coil in a direction so that a distance from the arm connection point of the case to the front end of the coil pressing arm increases.

In the above described hydraulic pressure control device, a yoke to be integrated with the solenoid coil may be configured by end walls facing both ends of the coil and an intermediate wall whose both ends are connected to sides of the two end walls so that the yoke has a U-shape in a side view, and then the coil pressing arm may be deflected to the intermediate wall of the yoke, and the side wall of the yoke is pressed by the front end portion of the coil pressing arm in the vicinity of the intermediate wall of the yoke rather than the coil center.

In the above described hydraulic pressure control device, a protrusion may be provided at the front end of the coil pressing arm so that and the solenoid coil is pressed by the protrusion In the above described hydraulic pressure control device, at least one coil pressing arm may be provided for respective coils. Even if the number of arms for respective coils is one, the coil fixation is achieved. However, if there is no problem in terms of space, a plurality of arms may be provided for respective coils.

According to the hydraulic pressure control device of this disclosure, the coil pressing arm is formed and provided integrally with the resin case of the electronic control unit, and the coil is pressed by the coil pressing arm. Therefore, it is unnecessary to separately provide an elastic supporting member such as a bent or riveted flat spring or rubber balls, and it also is unnecessary to fix the elastic supporting member to the case, the yoke of the solenoid valve, or the like.

Accordingly, it is possible to reduce the number of components, to simplify the structure of the hydraulic pressure control device, and to reduce man-hour for assembling. Since the coil pressing arm needs only to have a plate shape which is not so thick, an installation space rarely increases, and it is also possible to reduce the case in size.

Also, since at least one of the thickness and width of the coil pressing arm is gradually reduced from the root side toward the front end side, the elastic deformability of the coil pressing arm increases, and the proof stress of the coil pressing arm is improved. This improvement of the proof stress leads to an improvement in the stability of pressing, the life of the coil pressing arm, or the like.

Also, since the protrusion is provided to the front end of the coil pressing arm and pressing is performed by the protrusion, it is possible to enhance the stability of fixation, without changing a pressing point.

Even in a case of extending the front end of the coil pressing arm over the center of the solenoid coil, or in a case of bending the coil pressing arm along the outer circumference of the coil as viewed from an axially direction of the coil, it is possible to perform pressing at an appropriate place, and enhance the stability of fixation based on the pressing.

In addition, since a yoke having a U-shape in a side view is used and the end wall of the yoke is pressed by the front end of the coil pressing arm at a position deflected to the intermediate wall side of the yoke, a position close to the center of the solenoid coil (the center of the solenoid coil of the present embodiment is deflected to the side where the intermediate wall of the yoke is present) is pressed. Therefore, the stability of fixation is to be high, and the hydraulic pressure control device is superior in the effect of suppressing rattling of the solenoid coil according to vehicle vibration or the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
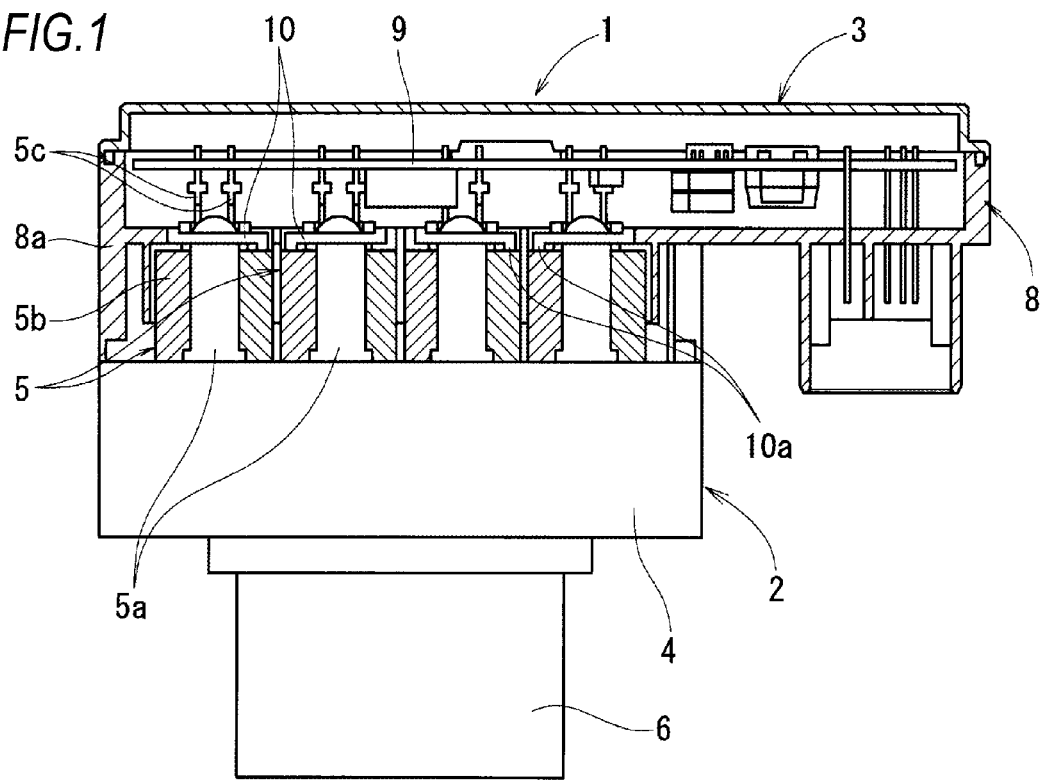
FIG. 1 is a partially broken side view illustrating an example of a hydraulic pressure control device of this disclosure.

Hereinafter, an illustrative embodiment of a hydraulic pressure control device of this disclosure will be described with reference to FIGS. 1 to 4 of the accompanying drawings. FIG. 1 shows the outline of an example of the hydraulic pressure control device. This hydraulic pressure control device 1 is configured by combining a hydraulic pressure unit 2 and an electronic control unit 3.

The hydraulic pressure unit 2 is configured by assembling a pump (not shown) and the main body 5a of a solenoid valve 5 for hydraulic pressure control, with a hydraulic pressure block (housing) 4, and mounting a motor 6 for driving the pump on one surface of the hydraulic pressure block 4. Inside the hydraulic pressure block 4, a pressure sensor, a damper, a low-pressure reservoir, or the like may be mounded if necessary.

The main body 5a of the solenoid valve protrudes toward the outside of the hydraulic pressure block, and onto the outer circumference of that protruding portion, a solenoid coil 5b is fit. As the solenoid coil 5b, a solenoid coil configured by integrally combining a coil wound around a bobbin (not shown) and a yoke 7 (see FIGS. 2 and 3) is used. A reference symbol '5c' represents a terminal which connects the solenoid coil 5b to a power supply circuit.

Figure 3:
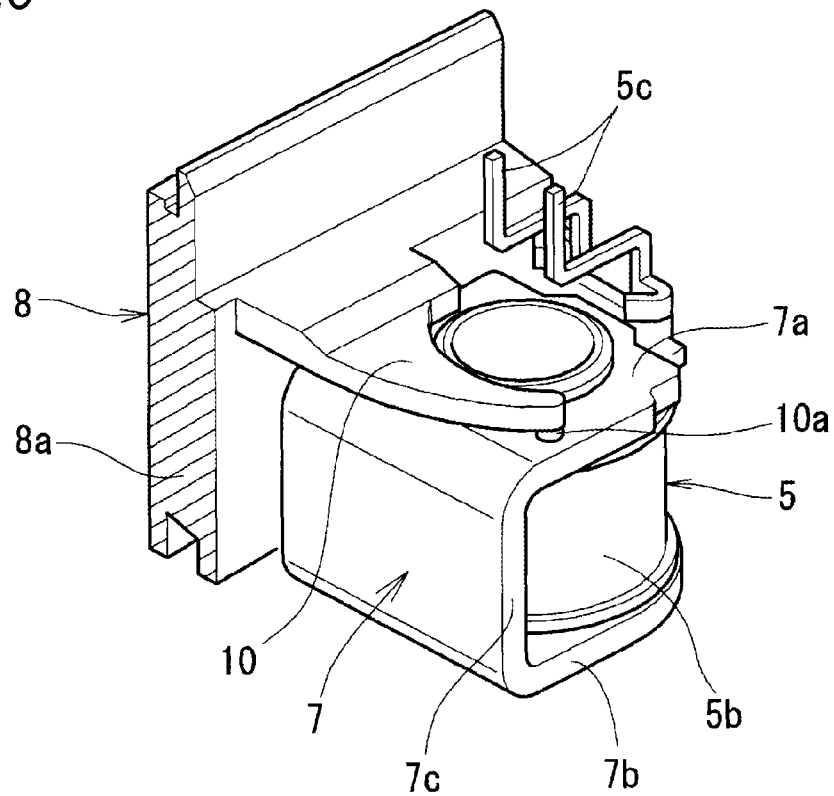
FIG. 3 is a perspective view illustrating the pressed state of the solenoid coil by the coil pressing arm.

As the yoke 7, as shown in FIG. 3, a yoke composed of end walls 7a and 7b facing both ends of the coil, and an intermediate wall 7c whose both ends are connected to sides of the two end walls, and having a U shape in a side view is used.

The electronic control unit 3 is configured by storing a circuit board 9 having a drive control circuit (not shown) of the solenoid valve inside a resin case 8.

The resin case 8 is formed, for example, with polybutylene terephthalate (PBT), and the case is fixed to the hydraulic pressure block 4 by bolts or the like. A coil pressing arm 10 is formed and provided integrally with the resin case 8.

In the illustrative hydraulic pressure unit, the coil pressing arm 10 is connected to a side wall 8a of the resin case 8. The base end of the coil pressing arm 10 is connected to the side wall 8a, and the front end (free end) of the arm extends in a direction so that a distance from the side wall 8a increases.

The coil pressing arm 10 has a protrusion 10a provided at the front end and protruding toward the coil side, and the protrusion is brought into contact with the yoke 7, thereby pressing the coil. At this time, the pressing force is generated by bending (elastically deforming) of the coil pressing arm 10 in a thickness direction in a state where the resin case 8 is fixed to the hydraulic pressure block 4.

The elastically deformed coil pressing arm 10 tries to be restored by its elasticity, and then this restoring force presses and fixes the yoke 7 against and to the hydraulic pressure block 4.

Figure 2:
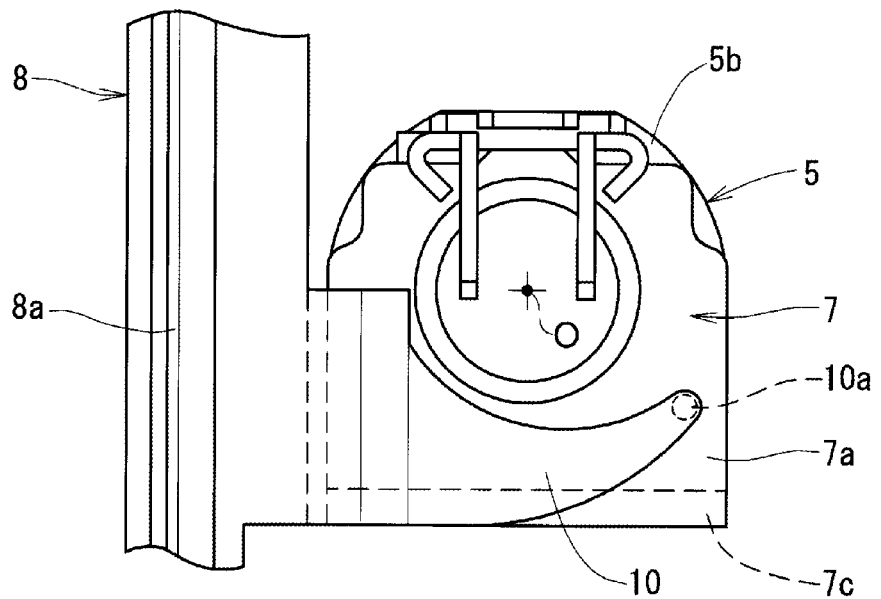
FIG. 2 is a view illustrating a pressed state of a solenoid coil by a coil pressing arm as seen in an arrow direction of FIG. 1.

Also, in the illustrative coil pressing arm 10, the width is reduced toward the front end side as shown in FIG. 2, and the thickness of the front end side is thinner than that of the front end side as shown in FIG. 3. Therefore, the coil pressing arm 10 is easy to bend.

Also, the front end side extends over the center O of the coil in the direction so that the distance from the side wall 8a of the case increases, and is almost entirely bent along a part of the outer circumference of the coil in a view taken as an coil end has been directly seen, i.e. an axially direction of the coil. Therefore, the arm length is sufficiently secured, and the coil pressing arm 10 is superior in the proof stress and the elastic deformability.

Since the illustrative hydraulic pressure control device uses the yoke 7 having a U-shape in a side view, the center of the solenoid coil 5b is deflected to the side where the intermediate wall 7c of the yoke is present. Further, the coil pressing arm 10 is disposed at a position deflected to the side where the intermediate wall 7c of the yoke is present, in a state seen in the axial direction through the center O of the coil as shown in FIG. 2, and the vicinity of the intermediate wall 7c rather than the coil center O in the yoke end wall 7a is pressed by the front end of the coil pressing arm 10. Therefore, the pressing is performed at a position close to the center of the solenoid coil, and the fixation of the coil is stable.

Figure 4:
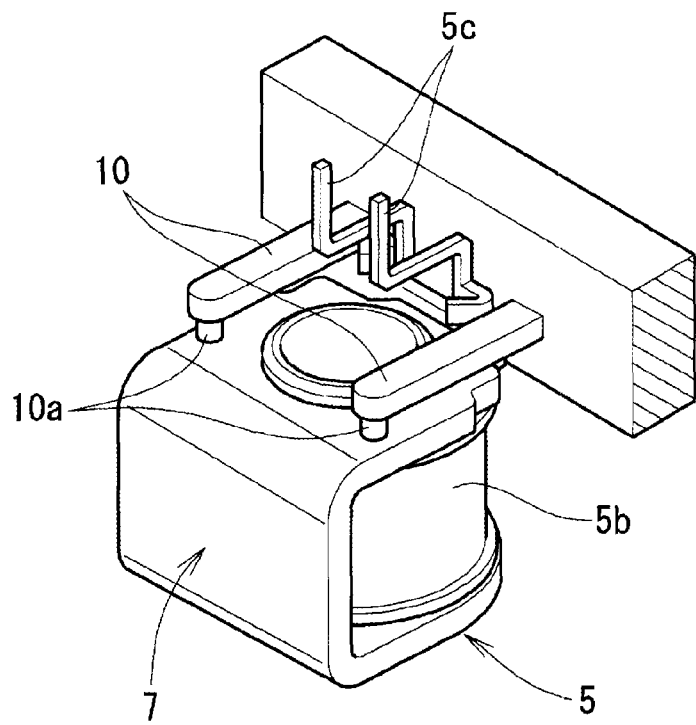
FIG. 4 is a perspective view illustrating coil pressing arms and a pressed state of a coil in another example.

FIG. 4 shows a main portion of another example of the hydraulic pressure control device of this disclosure. As shown in FIG. 4, respective coils pressing arm 10 may be a straight arm, and a plurality of coil pressing arms may be provided.

Also, in a case where a rib is disposed to be suspended between the facing side walls inside the resin case, a pressing arm 10 may extend from the rib.

What is claimed is:

1. A hydraulic pressure control device comprising:
a hydraulic pressure unit, in which a solenoid valve for hydraulic pressure control is assembled with a hydraulic pressure block; and
an electronic control unit, which includes a circuit board having a drive control circuit of the solenoid valve and stored inside a resin case,
wherein a solenoid coil is fit onto the main body of the solenoid valve fixed to the hydraulic pressure block of hydraulic pressure unit,
wherein the solenoid coil is elastically pressed against and fixed to the hydraulic pressure block by a coil pressing arm, which extends in a direction of a surface of the circuit board and is integrally formed with the resin case,
wherein at least one of a thickness and width of the coil pressing arm is continuously reduced from a root side of the arm connected to the resin case toward a front end side over an entire length of the coil pressing arm,
wherein a front end of the coil pressing arm is a free end, and
wherein a protrusion configured to press the solenoid coil is provided at the front end of the coil pressing arm, the protrusion protruding in a direction orthogonal to the extending direction of the coil pressing arm.

2. The hydraulic pressure control device according to claim 1,
wherein the front end of the coil pressing arm extends past a center of the coil in a direction of increasing distance from an arm connection point of the case toward the front end of the coil pressing arm.

3. The hydraulic pressure control device according to claim 1,
wherein a yoke integrated with the solenoid coil is configured by end walls facing both ends of the coil and an intermediate wall whose both ends are connected to sides of the end walls so that the yoke has a U-shape in a side view, and
wherein the coil pressing arm is biased to the intermediate wall of the yoke, and one of the end walls of the yoke is pressed by the front end of the coil pressing arm in the vicinity of the intermediate wall of the yoke rather than a center of the coil.

4. The hydraulic pressure control device according to claim 1,
wherein the coil pressing arm is formed along at least part of an outer circumference of the solenoid coil, as viewed from an axial direction of the coil.

5. The hydraulic pressure control device according to claim 1,
wherein at least one coil pressing arm is provided for respective coils.

6. The hydraulic pressure control device, according to claim 1,
wherein the coil pressing arm is substantially planar from the root side of the coil pressing arm to the front end side of the coil pressing arm.

7. The hydraulic pressure control device, according to claim 6,
wherein the width of the coil pressing arm is continuously reduced from the root side toward the front end side, and
wherein the thickness of the coil pressing arm is constant from the root side to the front end side.

8. A hydraulic pressure control device comprising:
a hydraulic pressure unit, in which a solenoid valve for hydraulic pressure control is assembled with a hydraulic pressure block; and
an electronic control unit, which includes a circuit board having a drive control circuit of the solenoid valve and stored inside a resin case,
wherein a solenoid coil is fit onto the main body of the solenoid valve fixed to the hydraulic pressure block of hydraulic pressure unit,
wherein the solenoid coil is elastically pressed against and fixed to the hydraulic pressure block by a coil pressing arm integrally formed with the resin case, and
wherein the coil pressing arm is substantially bent along a part of an outer circumference of the coil in a view taken in an axial direction of the coil.

* * * * *